United States Patent [19]
Johansson

[11] Patent Number: 5,913,163
[45] Date of Patent: Jun. 15, 1999

[54] INTEGRATED LOCAL COMMUNICATION SYSTEM

[75] Inventor: Torbjörn Karl Håkan Johansson, Lund, Sweden

[73] Assignee: Telefonaktiebolaget LM Ericsson, Stockholm, Sweden

[21] Appl. No.: 08/616,054

[22] Filed: Mar. 14, 1996

[51] Int. Cl.[6] .................................................. H04Q 7/26
[52] U.S. Cl. .................... 455/426; 455/462; 455/554; 455/555; 455/575; 455/349
[58] Field of Search ................................ 455/426, 462, 455/463, 464, 465, 467, 468, 449, 552, 554, 555, 557, 11.1, 575, 347, 349, 351, 100; 379/430; 375/328, 338

[56] References Cited

U.S. PATENT DOCUMENTS

| | | | |
|---|---|---|---|
| 3,829,617 | 8/1974 | Caithamer et al. | 179/7.1 R |
| 4,112,257 | 9/1978 | Frost | 179/2 EB |

(List continued on next page.)

FOREIGN PATENT DOCUMENTS

| | | |
|---|---|---|
| 0 416 598 A2 | 3/1991 | European Pat. Off. . |
| 0 550 151 A1 | 11/1992 | European Pat. Off. . |
| 0 563 864 A3 | 3/1993 | European Pat. Off. . |
| 0 577 296 | 6/1993 | European Pat. Off. . |
| 0 577 296 A1 | 6/1993 | European Pat. Off. . |
| 0 550 151 A1 | 7/1993 | European Pat. Off. . |
| 0 563 864 A2 | 10/1993 | European Pat. Off. . |
| 0 669 746 A1 | 2/1995 | European Pat. Off. . |
| 0 669 773 A2 | 2/1995 | European Pat. Off. . |
| 0669746 | 2/1995 | European Pat. Off. . |
| 0669773 | 2/1995 | European Pat. Off. . |
| 0 684 714 A2 | 5/1995 | European Pat. Off. . |
| 0684714 | 5/1995 | European Pat. Off. . |
| 0 669 746 | 8/1995 | European Pat. Off. . |
| 0 669 773 | 8/1995 | European Pat. Off. . |
| 37 23 620 A1 | 7/1987 | Germany . |
| 37 37 647 A1 | 11/1987 | Germany . |
| 37 23 620 A1 | 1/1989 | Germany . |
| 37 37 647 A1 | 5/1989 | Germany . |
| 41 07 728 A1 | 3/1991 | Germany . |
| 41 18 992 A1 | 6/1991 | Germany . |
| 41 25 907 A1 | 2/1992 | Germany . |
| 41 07 728 A1 | 9/1992 | Germany . |
| 41 18 992 A1 | 12/1992 | Germany . |
| 43 23 144 A1 | 7/1993 | Germany . |
| 4323144 | 7/1993 | Germany . |
| 43 23 144 | 10/1993 | Germany . |
| 43 29 721 A1 | 3/1994 | Germany . |
| 2 289 192 | 11/1995 | Germany . |
| 43 10 873 C2 | 11/1995 | Germany . |
| 4-92542 | 3/1992 | Japan . |
| 2 225 512 | 5/1990 | United Kingdom . |
| 2 289 192 | 11/1995 | United Kingdom . |
| WO 87/00718 | 1/1987 | WIPO . |
| 9108629 | 6/1991 | WIPO . |
| WO 91/08629 | 6/1991 | WIPO . |
| W0 93/16550 | 8/1993 | WIPO . |

(List continued on next page.)

*Primary Examiner*—Wellington Chin
*Assistant Examiner*—Philip J. Sobutka
*Attorney, Agent, or Firm*—Jenkens & Gilchrist

[57] ABSTRACT

An integrated local communication system comprising a plurality of locally-positioned communication devices, at least one of which locally-positioned communication devices is operably coupled to a local interface module. A local communication link is selectably effectuated between any two locally-positioned communication devices via at least one local interface module by transforming a non-local communication signal into a local communication signal and transceiving the local communication signal using a single preselected communication protocol that is common to all local communication links. An exemplary embodiment may include at least one mobile station associated with a Public Land Mobile Network, at least one radio-enhanced phone interfacing device associated with a Public Switching Telephone Network, at least one electronic data terminal selectably disposed in a distributed computing environment, and at least one wireless headset for hands-free operability.

6 Claims, 16 Drawing Sheets

U.S. PATENT DOCUMENTS

| | | | |
|---|---|---|---|
| 4,233,473 | 11/1980 | Frost | 179/2 EB |
| 4,484,029 | 11/1984 | Kenney | 179/2 EA |
| 4,538,028 | 8/1985 | Gazzoli et al. | 179/2 EA |
| 4,538,029 | 8/1985 | Gazzoli et al. | 179/2 EA |
| 4,558,178 | 12/1985 | Yausda et al. | 179/2 E |
| 4,659,878 | 4/1987 | Dinkins | 370/71 |
| 4,698,839 | 10/1987 | De Vaney et al. | 379/60 |
| 4,731,812 | 3/1988 | Akerberg | 379/61 |
| 4,741,030 | 4/1988 | Wilson | 379/368 |
| 4,752,949 | 6/1988 | Steinbeck et al. | 379/61 |
| 4,790,000 | 12/1988 | Kinoshita | 455/449 |
| 4,811,420 | 3/1989 | Avis et al. | 455/51 |
| 4,837,801 | 6/1989 | Shimura | 379/61 |
| 4,839,918 | 6/1989 | Hata | 379/61 |
| 4,876,738 | 10/1989 | Selby | 455/33 |
| 4,882,745 | 11/1989 | Silver | 379/61 |
| 4,972,457 | 11/1990 | O'Sullivan | 379/59 |
| 4,979,207 | 12/1990 | Baum et al. | 379/112 |
| 4,989,230 | 1/1991 | Gillig et al. | 379/59 |
| 5,003,584 | 3/1991 | Benyacar et al. | 379/119 |
| 5,027,388 | 6/1991 | Bradshaw et al. | 379/112 |
| 5,063,591 | 11/1991 | Jodoin | 379/115 |
| 5,113,428 | 5/1992 | Fitzgerald | 379/61 |
| 5,117,449 | 5/1992 | Metroka et al. | 379/58 |
| 5,127,041 | 6/1992 | O'Sullivan | 455/557 |
| 5,127,042 | 6/1992 | Gillig et al. | 379/59 |
| 5,133,004 | 7/1992 | Heileman, Jr. et al. | 379/67 |
| 5,148,472 | 9/1992 | Freese et al. | 379/59 |
| 5,191,602 | 3/1993 | Regen et al. | 379/58 |
| 5,212,684 | 5/1993 | MacNamee et al. | 370/24 |
| 5,218,632 | 6/1993 | Cool | 379/126 |
| 5,259,017 | 11/1993 | Langmantel | 379/58 |
| 5,260,988 | 11/1993 | Schellinger et al. | 379/59 |
| 5,291,543 | 3/1994 | Freese et al. | 379/59 |
| 5,303,286 | 4/1994 | Wiedeman | 379/59 |
| 5,309,502 | 5/1994 | Hirai | 379/59 |
| 5,311,571 | 5/1994 | Pickert | 379/58 |
| 5,311,572 | 5/1994 | Friedes et al. | 379/67 |
| 5,321,735 | 6/1994 | Breeden et al. | 379/58 |
| 5,327,483 | 7/1994 | Kikuchi | 379/61 |
| 5,335,262 | 8/1994 | Oguchi et al. | 379/58 |
| 5,345,498 | 9/1994 | Mauger | 379/58 |
| 5,365,573 | 11/1994 | Sakamoto et al. | 379/61 |
| 5,367,558 | 11/1994 | Gillig et al. | 379/59 |
| 5,379,339 | 1/1995 | Sakamoto | 379/61 |
| 5,384,829 | 1/1995 | Heileman, Jr. et al. | 379/67 |
| 5,390,233 | 2/1995 | Jensen et al. | 379/58 |
| 5,392,462 | 2/1995 | Komaki | 455/89 |
| 5,406,615 | 4/1995 | Miller, II et al. | 379/59 |
| 5,426,689 | 6/1995 | Griffith et al. | 379/58 |
| 5,442,680 | 8/1995 | Schellinger et al. | 379/58 |
| 5,444,773 | 8/1995 | Hirsohn et al. | 379/219 |
| 5,448,623 | 9/1995 | Wiedeman et al. | 379/59 |
| 5,448,632 | 9/1995 | Iyob et al. | 379/201 |
| 5,450,471 | 9/1995 | Hanawa et al. | 379/58 |
| 5,450,616 | 9/1995 | Rom | 455/69 |
| 5,463,674 | 10/1995 | Gillig et al. | 379/59 |
| 5,465,397 | 11/1995 | Pickert | 455/62 |
| 5,465,401 | 11/1995 | Thompson | 455/89 |
| 5,479,479 | 12/1995 | Braitberg et al. | 379/58 |
| 5,493,703 | 2/1996 | Yamashita | 455/557 X |

FOREIGN PATENT DOCUMENTS

| | | |
|---|---|---|
| WO 93/16550 | 8/1993 | WIPO . |
| 9429966 | 12/1994 | WIPO . |
| WO 94/29966 | 12/1994 | WIPO . |
| 9501070 | 1/1995 | WIPO . |
| WO 95/01070 | 1/1995 | WIPO . |
| WO 95/10142 | 4/1995 | WIPO . |
| 9529566 | 11/1995 | WIPO . |
| WO 95/29566 | 11/1995 | WIPO . |

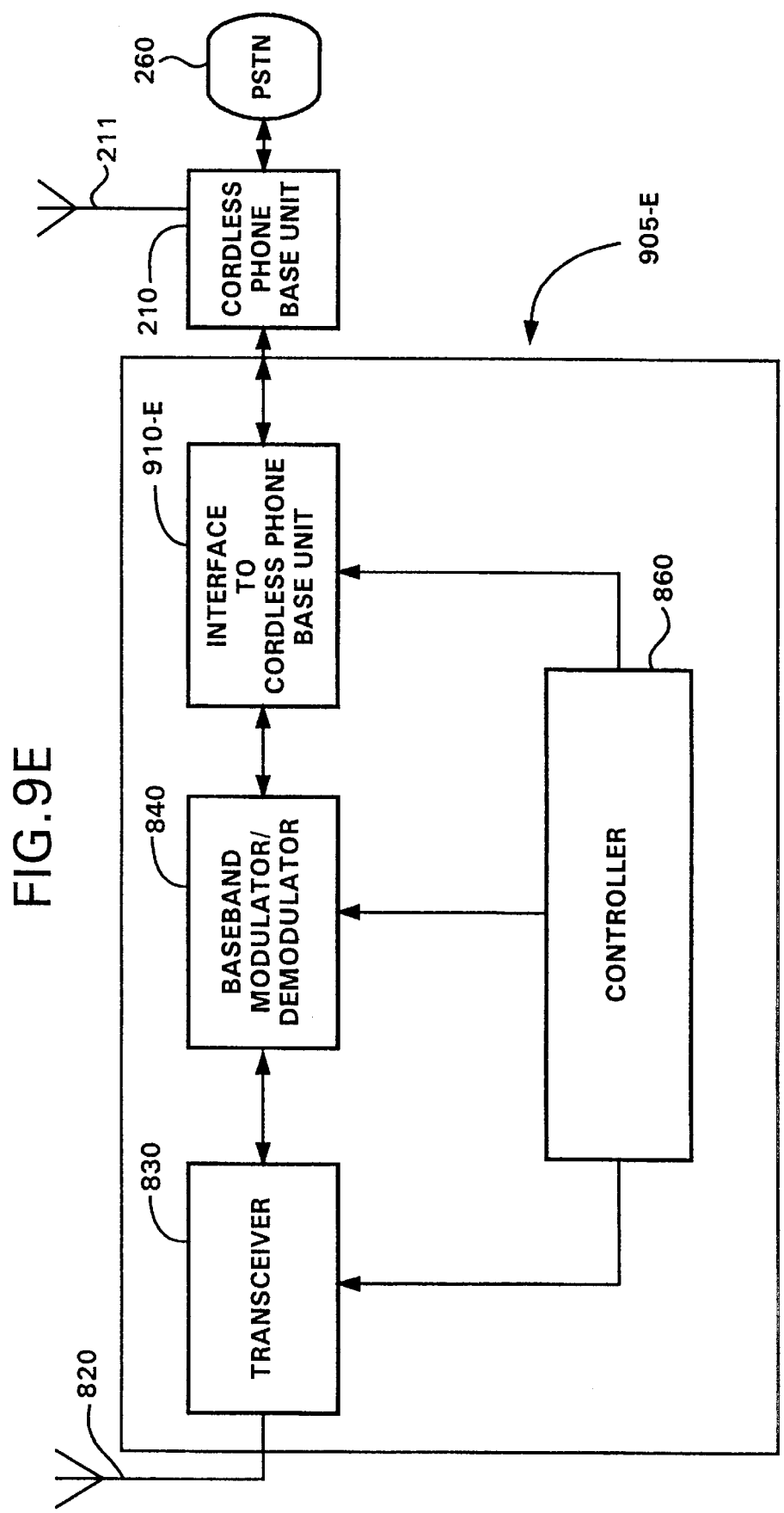

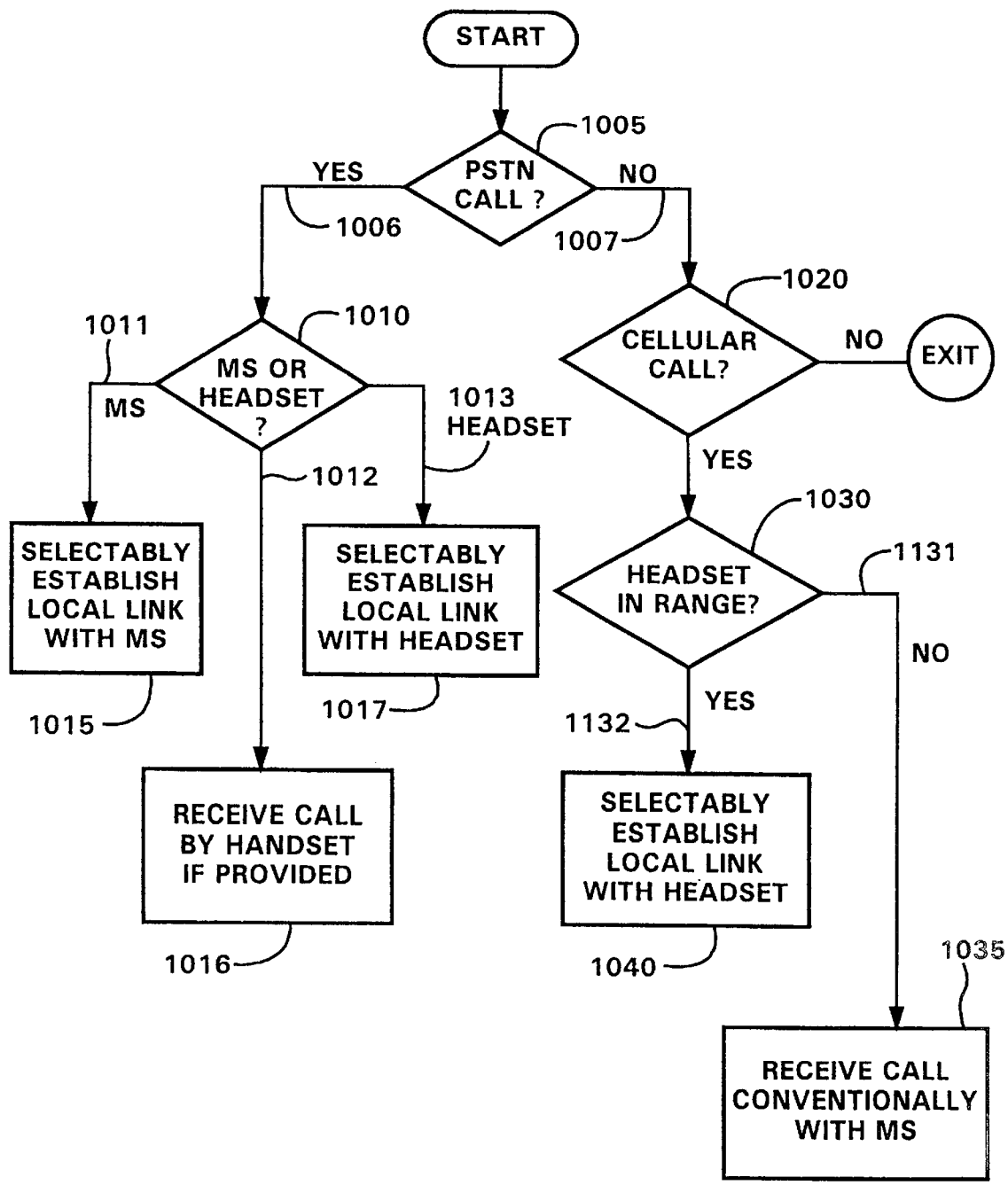

INTEGRATED LOCAL COMMUNICATION SYSTEM

CROSS-REFERENCE TO RELATED APPLICATIONS

This application hereby incorporates by reference the following co-assigned patent applications which describe related subject matter in greater detail: U.S. patent application Ser. No. 08/476,504, entitled "MODULAR UNIT HEADSET", filed Jun. 7, 1995 inventors: Nils Rutger Rydbeck and Per Stein); U.S. patent application Ser. No. 08/471,606, entitled "ELECTRONIC EQUIPMENT AUDIO SYSTEM", filed Jun. 6, 1995; U.S. patent application Ser. No. 08/577,086, entitled "IDENTIFICATION OF MOBILE CALLS WITHIN A MOBILE TELEPHONE SYSTEM", filed Dec. 22, 1995 inventor: Eric Valentine); and U.S. patent application Ser. No. 08/353,966, entitled "MODULAR RADIO COMMUNICATIONS SYSTEM", filed Dec. 12, 1994 inventor: Per Stein).

BACKGROUND OF THE INVENTION

1. Technical Field of the Invention

The present invention relates to communication systems and, more particularly, to an integrated local area communication system.

2. Description of Related Art

Recent advances in wireless telecommunications have been multi-faceted, resulting in a myriad of new products and services. In the mobile cellular telecommunications area, some of the new services include both private services usually provided within a home or business environment for private mobile subscribers and public services provided through a public land mobile network for public mobile subscribers. Both private and public mobile service may be provided on a cellular basis, with mobile subscribers being allowed to roam between the geographic coverage areas of different base stations of each of the private and public systems.

Private mobile service is typically provided through a private mobile telephony network that is implemented using a private cordless system standard such as the Cordless Telephone Standard 2 (CT-2). Private telephony systems may be provided as stand-alone networks or connected to a fixed telephony network.

Public mobile service is, on the other hand, generally provided through a cellular telecommunications network using one of the common cellular transmission standards such as the Advanced Mobile Phone Service (AMPS) System Standard, or the Global System for Mobile Communication (GSM) Standard.

Another direction in which there have been related developments is the area of cordless telephony products. Cordless telephone communications systems that are connected to a public switching telephone system (PSTN) have been known for some time. Cordless telephones operate utilizing a portable telephone unit in communication with a base station through a pair of radio frequency (RF) transceivers in the portable unit and in the base station. When the device is operable and a call is placed, dial tone and voice signals are transmitted from the RF transmitter in the portable unit to the RF receiver in the base station, and then over the PSTN lines in the ordinary manner. Similarly, when a call is received, the voice signals are transmitted from the RF transmitter in the base station to the RF receiver in the portable unit.

Although cordless telephones are convenient in that they allow telephone communication without the impaired-mobility imposed by a cord, they still require, like conventional corded telephones, usage of at least one hand to hold the portable unit for operating. Recent attempts that address the limitations of conventional cordless telephones have resulted in headset-like portable units that allow hands-free operation. In U.S. Pat. No. 4,882,745 to Silver, a "cordless headset telephone" is described in which only a single earphone is included to cover one ear while leaving the other ear open. Another related device is disclosed in U.S. Pat. No. 4,741,030 to Wilson, wherein a cordless headset is provided with a dial board positioned near the microphone for easy viewing by the user. As in the Silver device, the Wilson device does not disclose the use of two earphones and a volume control to enhance sound quality and to block external ambient noise. Another cordless telephone headset using only a single earphone is disclosed in U.S. Pat. No. 4,484,029 to Kennedy.

A recent improvement over these above-mentioned cordless telephone headsets is described in U.S. Pat. No. 5,113,428, wherein the portable unit is totally contained in a headset having its own push button key pad, related control buttons, a rechargeable battery, an RF transceiver and two earphones with volume control.

A co-assigned pending U.S. Patent Application, entitled "MODULAR UNIT HEADSET", cross-referenced hereinabove and incorporated by reference herein, describes an integrated system wherein a host electronic system, coupled to a PSTN, is capable of communicating with a headset by both wireless and wired means due to a modular unit attached to it. In yet another co-assigned pending U.S. Patent Application, entitled "ELECTRONIC EQUIPMENT AUDIO SYSTEM", cross-referenced hereinabove and incorporated by reference herein, describes a module port having a module connector, that is capable of communicating with a microphone via wireless and wired means.

It is readily apparent that a logical progression of these multi-faceted advances is towards increased inter-operability and modularized integration of multiple physical devices so as to enhance human operator convenience. For example, it would be an advantage to have a mobile station equipped with a modular unit that is capable of communicating with a cordless phone base station so that it can operate as an extension of the cordless phone to effectuate landline communication. It would be of further advantage to have a wireless headset that is capable of communicating on a single protocol with both the mobile station and cordless phone base station. In such a system, the human operator has the benefit of hands-free operation of multiple telecommunications devices without having to interchange different modular units. Additionally, it can be readily appreciated that it would be of significant advantage to inter-operably integrate an electronic data terminal into such a local area communication system (LACS) whereby the utility of the terminal is further maximized. It is apparent that such an electronic data terminal can be a computer, which in turn may be stand-alone or in a Local Area Network, or a telefax, a pager, a printer, or a hand-held data organizer. Further, integrating a conventional phone answering machine that is operable to play back an out-going greeting or a recorded caller message and to record an in-coming message, into the LACS will undoubtedly enhance operator convenience and the use of the device. The method and apparatus of the present invention and various components thereof provide such advantages.

SUMMARY OF THE INVENTION

In one aspect of a presently preferred exemplary embodiment, the present invention includes a local area communication system (LACS) comprising a plurality of locally-positioned communication devices, wherein any two locally-positioned communication devices are selectably operable to communicate with each other over a preselected communication medium, and further wherein at least one of which may be associated with an external or non-local communications network. Each of the locally-positioned communication devices is also provided with a corresponding local interface module wherein the local interface module is capable of receiving an incoming communication signal and transforming it into a local transport signal suitable for local transmission in accordance with at least one preselected common protocol. According to a presently preferred embodiment of the present invention, either the incoming communication signal or the local transport signal may be either analog or digital, suitably modulated according to known methods. Furthermore, either of these signals may comprise voice, video, or data, or any combination thereof. It is further envisioned herein that the local interface module may be functionally and structurally integrated into the circuitry of the corresponding communication device. Or, in an alternative aspect, the local interface module may be a pluggable module adapted to be received in a module port formed in the corresponding communication device.

In a further aspect, the present invention includes at least one mobile station associated with a cellular mobile telecommunications network, at least one phone interfacing device (PID) associated with a public switching telephone network (PSTN), at least an electronic data terminal and at least one hands-free unit. It will be readily understood upon reference hereto by one skilled in the art that such an electronic data terminal may be a computer that is selectably connectable to a network, or a printer, or a pager or a telefax machine or a hand-held data organizer. Or, the electronic data terminal may simply be in a different aspect a phone answering machine. Further, it is contemplated herein that the computer may be a multimedia computer of the type having graphic, audio, video and data interfaces. In addition, the PID can be a radio-enhanced phone interfacing device or a conventional corded phone having a handset connected by wire means to the cradle unit. Each of these devices is coupled to a corresponding local interface module which comprises a transceiver that is capable of selectably effectuating a local communication link between the local interface module of which it is a part and any other local interface module. The radio-enhanced phone interfacing device may be a conventional cordless phone base unit coupled with a local interface module, or alternatively, a local interface module directly-connectable to the PSTN with enhanced functionality, referred to herein and hereby as a home base station. Also, the home base station may be, in one embodiment, be equipped with a set of key pads to facilitate call initiation. In yet another aspect, the local interface module comprises an infra-red transceiver for selectably effectuating local communication links. Alternatively, it is contemplated herein that it is within the scope of the present invention to include a transceiver for effectuating local communication using other media, including but not limited to, electromagnetic waves, or optic waves, or microwaves or magnetic waves.

Accordingly, it is an object of the present invention to provide a LACS wherein there is further provided a mobile station that is selectably operable as a cordless phone handset to place or receive calls over the PSTN. It is a further object to provide a wireless headset that is selectably operable either as a wireless extension to a mobile station or as a hands-free remote unit in connection with a radio-enhanced phone interfacing unit associated with the PSTN. It is yet another object of the present invention to interoperably integrate an electronic data terminal, such as one described hereinabove, into the LACS of the present invention. It is a still further object of the present invention to provide two headsets, preferably wireless, that can engage using a common protocol in a local communication link between themselves and with a locally-positioned communication device other than a headset.

BRIEF DESCRIPTION OF THE DRAWINGS

A more complete understanding of the method and apparatus of the present invention may be had by reference to the following detailed description when taken in conjunction with the accompanying drawings wherein:

FIG. 9E is a block diagram of a presently preferred embodiment of a local interface module adapted for use with a cordless phone base unit associated with a PSTN in accordance with the present invention;

FIG. 10 shows an exemplary decision tree that may be used in accordance with the present invention to selectably effectuate local wireless communication for in-coming calls.

DETAILED DESCRIPTION OF THE DRAWINGS

Figure 1:
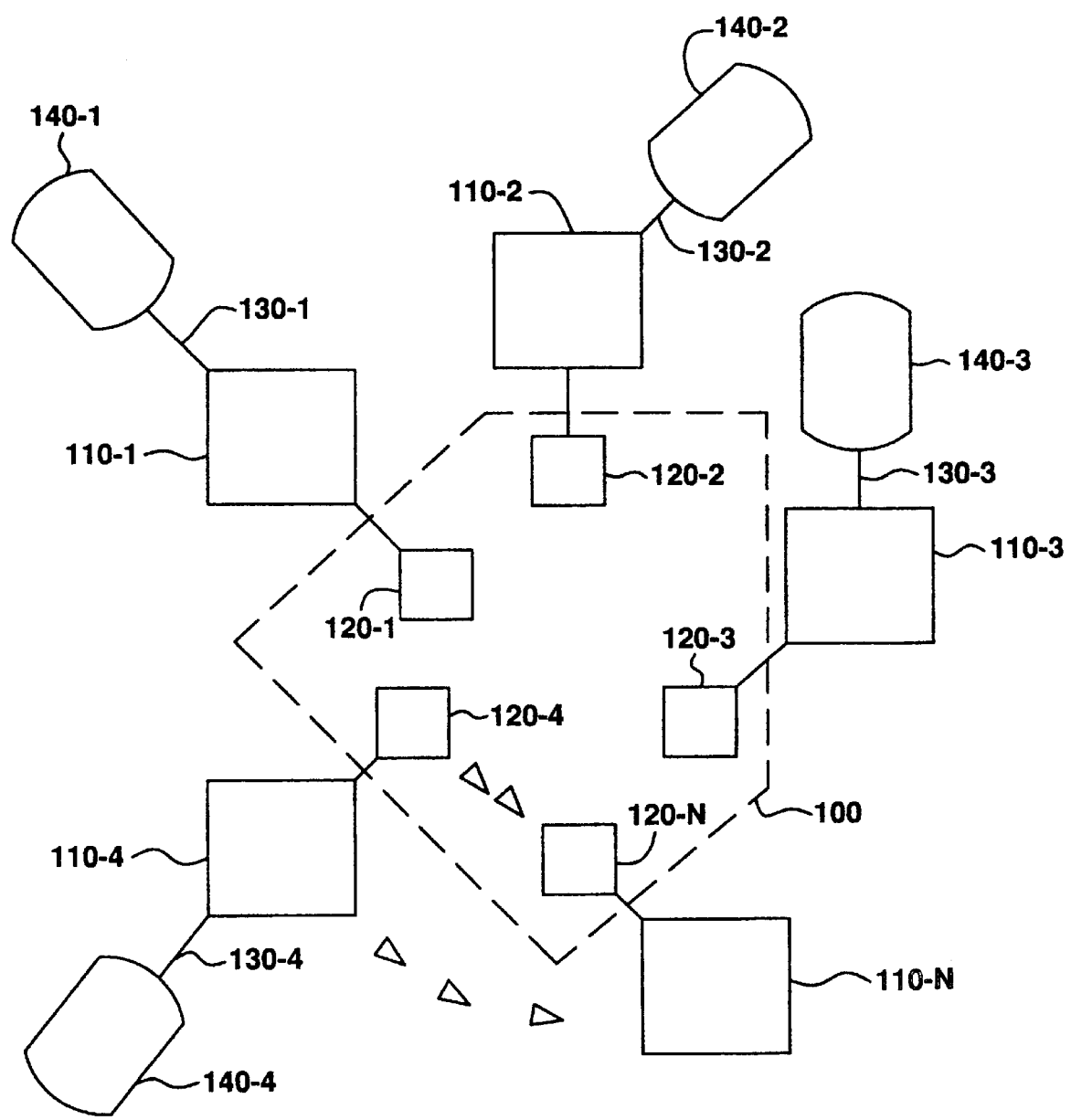
FIG. 1 is a block diagram of the broad network interconnection of an integrated local area communication system comprising a plurality of communication devices.

FIG. 1 depicts the broad network interconnection of an integrated local area communication system (LACS)

according to the present invention, generally denoted by reference numeral 100. The local communication system 100 envisions seamless integration of a plurality of electronic communications devices, 110-1 through 110-N, at least one of which may be connected to an external communication network, shown herein by reference numerals 140-1 through 140-4. The connections, 130-1 through 130-4, between the plurality of devices 110-1 through 110-4 and the external communications systems 140-1 through 140-4, may be wireless or wire-line, according to the present invention.

Still referring to FIG. 1, a plurality of local interface modules, 120-1 through 120-N, are shown as connected to the plurality of devices 110-1 through 110-N. According to a presently preferred exemplary embodiment of the present invention, each of the plurality of local interface modules 120-1 through 120-N is capable of effectuating wireless communication with the other N-1 local interface modules. According to the present invention, the local communication can be voice, video and data, or any combination thereof. Further, the local communication is effectuated upon a single communication protocol involving a local medium which can be electro-magnetic waves such as radio, infrared, optic spectra or microwaves, or magnetic waves, or wire-line. The local signal may be analog or digital, with any suitable modulation known in the art.

Figure 2:
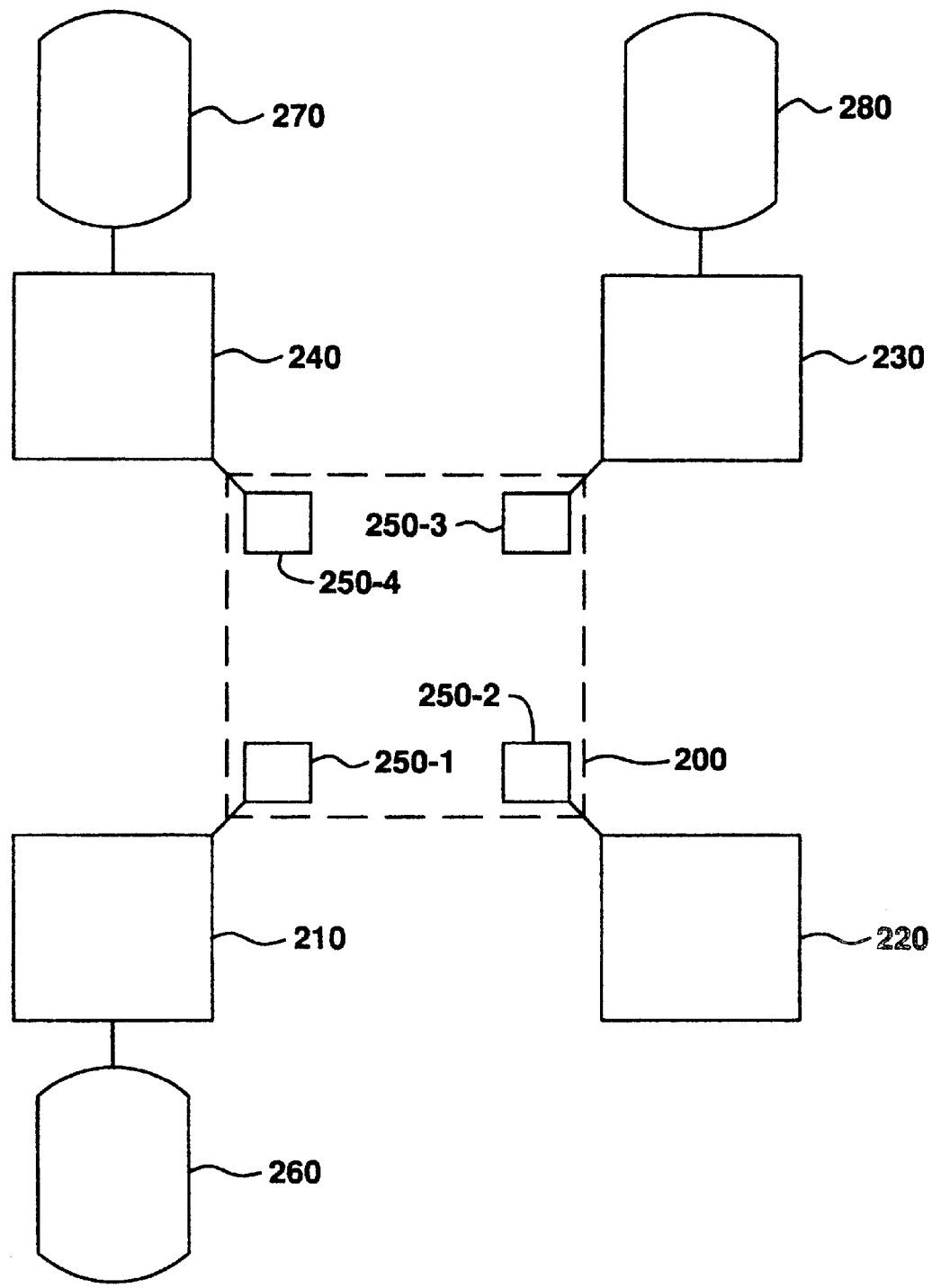
FIG. 2 is a block diagram of an integrated local communication system in accordance with a presently preferred exemplary embodiment of the present invention.

FIG. 2 illustrates a block diagram of a presently preferred exemplary embodiment of the present invention, generally denoted by reference numeral 200. Reference numeral 210 refers to a radio-enhanced phone interfacing device, coupled to a public switching telephone network (PSTN) 260. In one aspect of the invention, the radio-enhanced phone interfacing device 210 can be simply a known cordless phone base unit capable of short-range wireless communication in a home or office environment.

Continuing with FIG. 2, reference numeral 240 refers to a known mobile station associated with a Public Land Mobile Network (PLMN) 270. Reference numeral 230 refers to an electronic data terminal, as referenced and described hereinabove, that may be associated with a local area network (LAN) 280. It will be understood by the persons of ordinary skill in the art upon reference hereto that there are many known variations and modifications of the electronic data terminal 230. For instance, it can be a computer that is selectably associated within a distributed computing environment. Alternatively, it can also be a printer, or a telefax machine, or a pager, or a phone answering machine, or a hand-held data organizer. It is within the spirit of the present invention that these known variations and modifications of the electronic data terminal 230 are capable of being arranged in a local communication network in accordance with the present invention.

Still referring to FIG. 2, reference numeral 220 refers to a wireless headset, provided in a presently preferred exemplary embodiment to maximize user convenience in effectuating a local communication path. Reference numerals 250-1 through 250-4 refer to four local interface modules. The local interface module 250-1 is coupled to the radio-enhanced phone interfacing device 210, the local interface module 250-2 is coupled to the wireless headset 220, the local interface module 250-3 is coupled to the electronic data terminal 230 and the local interface module 250-4 is coupled to the mobile station 240. It will be appreciated by the persons of ordinary skill in the art that although the local interface modules 250-1 through 250-4 are shown as separate functional blocks, they are capable of being integrated structurally into their respective communication devices 210, 220, 230 and 240. Furthermore, the radio-enhanced phone interfacing device 210 may be such that its associated local interface module 250-1 is functionally integrated into its native circuitry as well. Similarly, the wireless headset 220 and the local interface module 250-2 can be, in one aspect of the invention, functionally integrated also.

Figure 3:
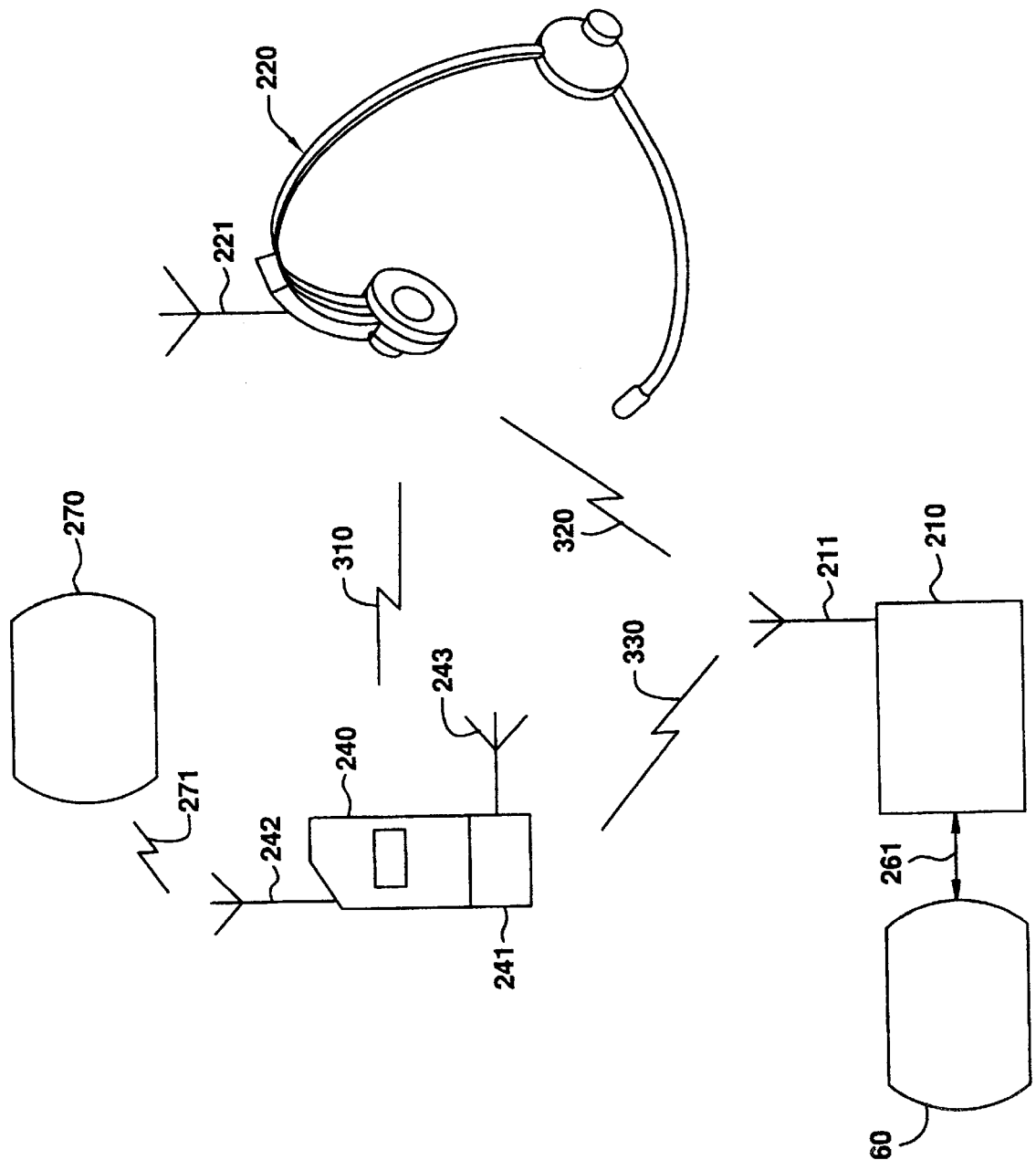
FIG. 3 is a block diagram of the implementation of a local area communication system in accordance with an aspect of a presently preferred exemplary embodiment of the present invention.

Referring now to FIG. 3, therein is shown an implementation of a local area communication system in accordance with an aspect of a presently preferred exemplary embodiment of the present invention. Reference numeral 210 is the radio-enhanced phone interfacing device that is associated with the PSTN 260 for external land-line communication. Reference numeral 261 is the associative path between the PSTN 260 and the radio-enhanced phone interfacing device 210. The communication signals on this path 261 may be analog or digital, and further, it may in a specific embodiment be a T1 phone line, or an Integrated Services Digital Network (ISDN) connection, or a high-capacity Asymmetric Digital Subscriber Line (ADSL). The radio-enhanced phone interfacing device 210, which is shown to have a local antenna 211 for local communication, may be a cordless phone base unit coupled with a corresponding local interface module (not shown) or a directly-connectable home base station.

The mobile station 240 is associated with the PLMN 270 for cellular communication. The cellular path 271 may be effectuated between the mobile station 240 and the PLMN 270 using any one of the common cellular transmission standards such as the Advanced Mobile station Service (AMPS) System standard or the Global System for Mobile Communication (GSM) Standard. The mobile station 240 is equipped with a non-local antenna 242 to facilitate transmission and reception of cellular communication signals between the mobile station 240 and a base station (not shown). In addition, the mobile station 240 is coupled to a local interface module 241 having a local antenna 243 for local communication. The coupling between the mobile station 240 and the local interface module 241 is such that the non-local cellular communication signals over the cellular path 271 are selectably convertible to local communication signals, and vice versa, to be transmitted on a local communication link as will be discussed hereinbelow.

The wireless headset 220 is operable either as a wireless extension to the mobile station 240 via a first local radio communication link 310 or as a hands-free phone unit for communication over the PSTN 260 via a second local radio communication link 320. A third local radio communication link 330 is selectably established between the mobile station 240 and the radio-enhanced phone interfacing device 210 whereby the mobile station 240 is selectably operable as a hands-on phone unit associated with the radio-enhanced phone interfacing device 210 to place a call over the PSTN 260.

Figure 4:
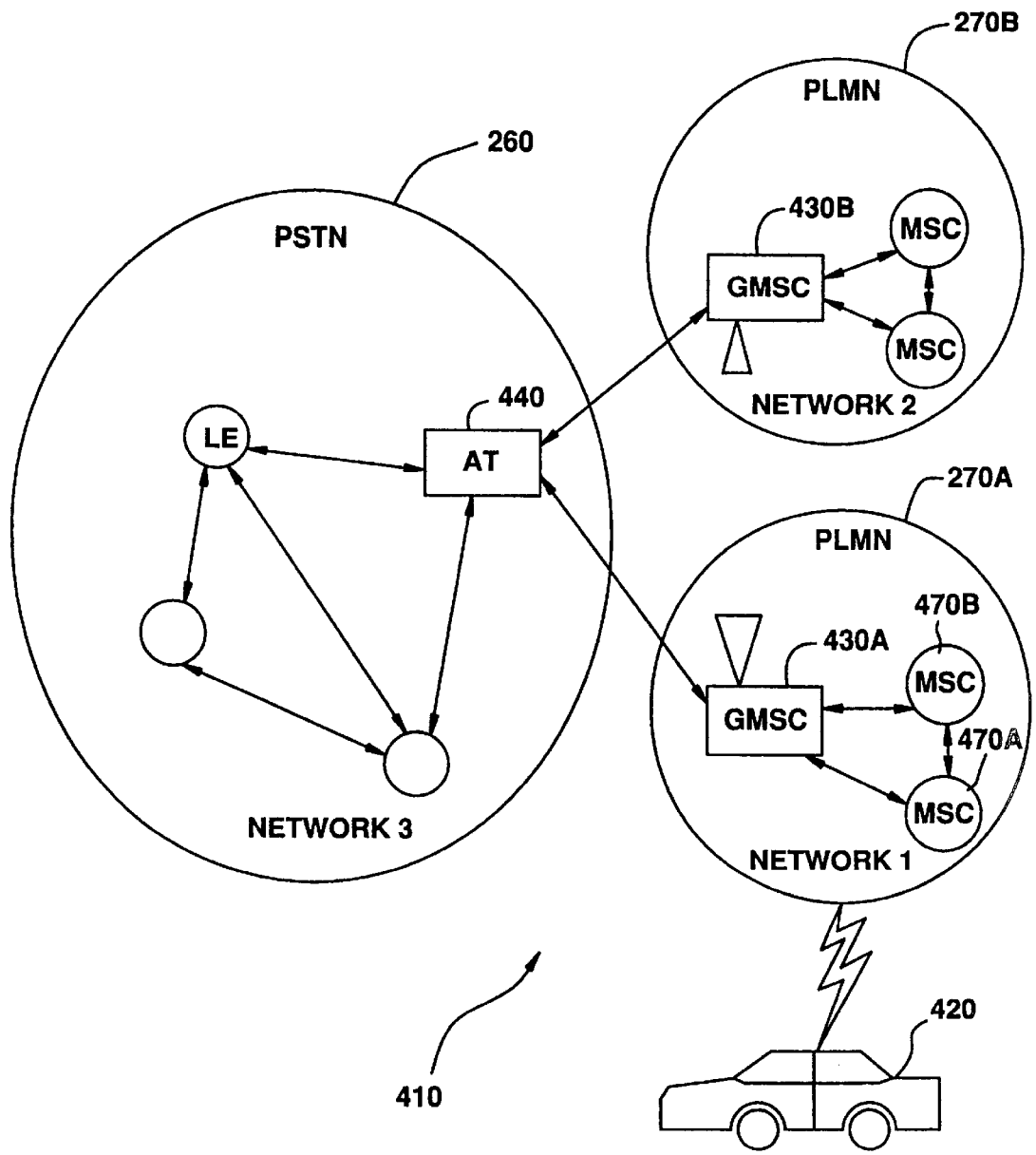
FIG. 4 illustrates a network interconnection of multiple Public Land Mobile Networks (PLMNs) to a Public Switching Telephone Network (PSTN)

Referring to FIG. 4, reference numeral 410 generally illustrates a possible network interconnection of multiple PLMNs 270A, 270B to PSTN 260, according to an aspect of the presently preferred exemplary embodiment of the present invention. A mobile subscriber (MS) 420 is associated with one of the PLMNs as its Home PLMN 270A. Within each PLMN 270A, 270B, there are multiple mobile switching centers (MSCs) 470A, 470B, servicing the geographical areas covered by the network. The mobile subscriber 420 who is served by its Home PLMN 270A is capable of communicating with other wireless and wire-line terminals by connecting with the PSTN 260 through a Gateway Mobile Switching Center (GMSC) 430A. An access tandem (AT) 440 associated within the PSTN 260 routes the mobile calls generated from the PLMN 270A to wire-line terminals serviced by one of its exchanges within the PSTN 260, or to another PLMN 270B by way of its GMSC 430B. If the mobile subscriber 420 travels outside the coverage area of its Home PLMN 270A and roams into the geographical area covered by an adjacent PLMN 270B, an interexchange handoff occurs between the Home PLMN 270A and the adjacent PLMN 270B whereby telecommunications service continues to be provided to the MS 420 from the adjacent PLMN 270B as a roaming subscriber.

Figure 5:
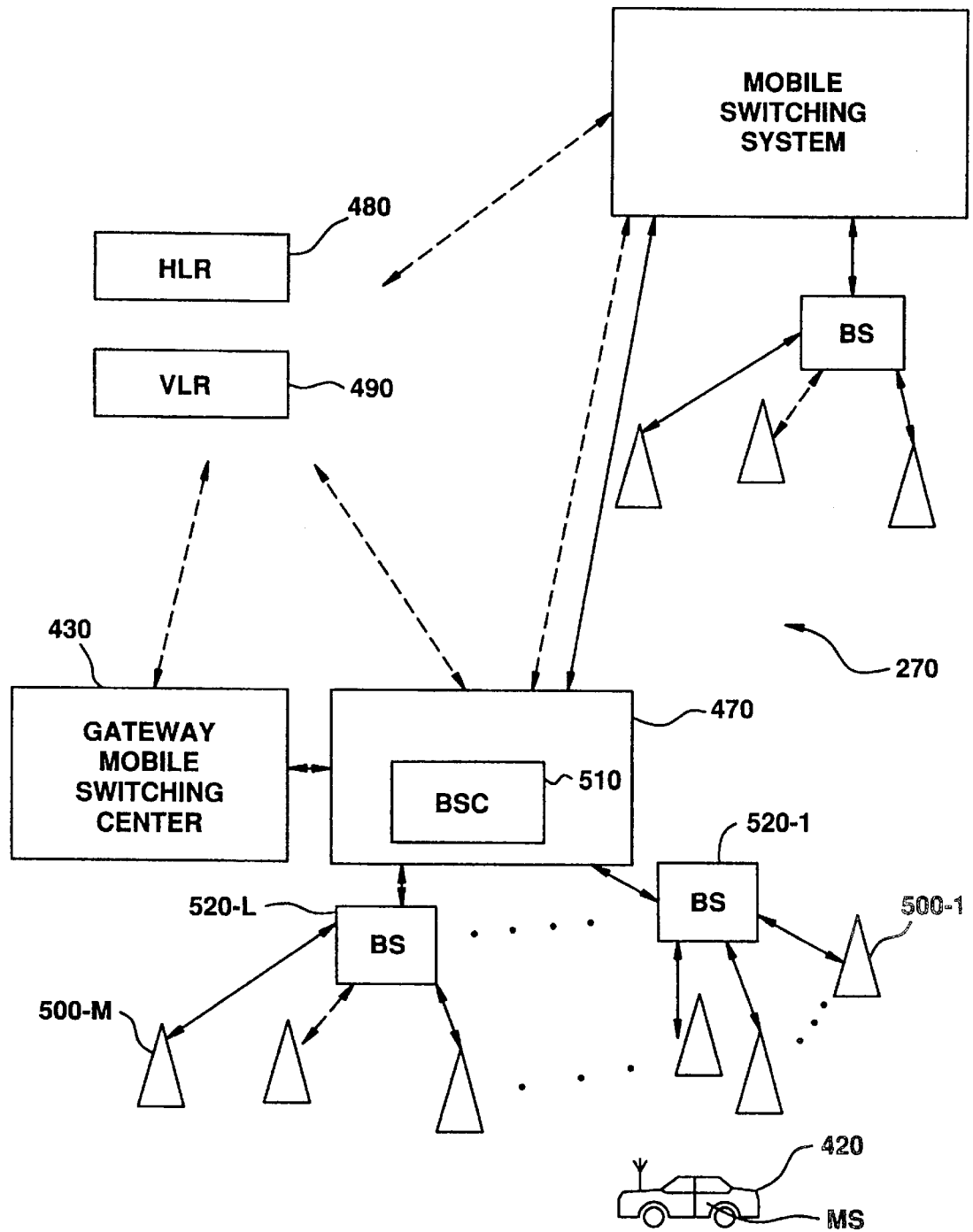
FIG. 5 is a block diagram of a PLMN.

FIG. 5 is a block diagram of the PLMN 270 including the mobile switching center 470. In addition, the PLMN 270 comprises a Home Location Register (HLR) 480, a Visitor Location Register (VLR) 490 and a number of antenna systems 500-1 through 500-M. The mobile switching center 470 is also generally known in the art as a base station system, and includes a base-station controller 510 and one or more of base-station transceiver stations(BS) 520-1 through 520-L. Each of the base-station transceiver stations is associated with a subgroup of the antenna systems 500-1 through 500-M. In order for the mobile subscriber 420 to be allocated to a home network, an entry in the HLR 480 is made. Whenever the MS 420 is switched on, and possibly at regular intervals thereafter, it will register with the PLMN 270 and give its location area.

The MSC 470 communicates directly with the HLR 480 and the VLR 490 for subscriber information and transfers calls from one BS to another as the MS 420 travels within the geographical area covered by the PLMN 270. Further, the GMSC 430 acts as a gateway to allow access to other wire-line terminals associated with the PSTN 260 or wireless mobile subscribers associated with other PLMNs.

The establishment of a cellular call within and without the PLMN 270 is typically effectuated via Signaling System No. 7 (SS7) network protocols utilizing network addresses. A co-assigned pending U.S. Patent Application, "IDENTIFICATION OF MOBILE CALLS WITHIN A MOBILE TELEPHONE SYSTEM", filed Dec. 22, 1995, cross-referenced hereinabove and incorporated by reference herein, describes a method and system for utilizing network addresses to construct a unique call identifier for a cellular call.

Figure 6:
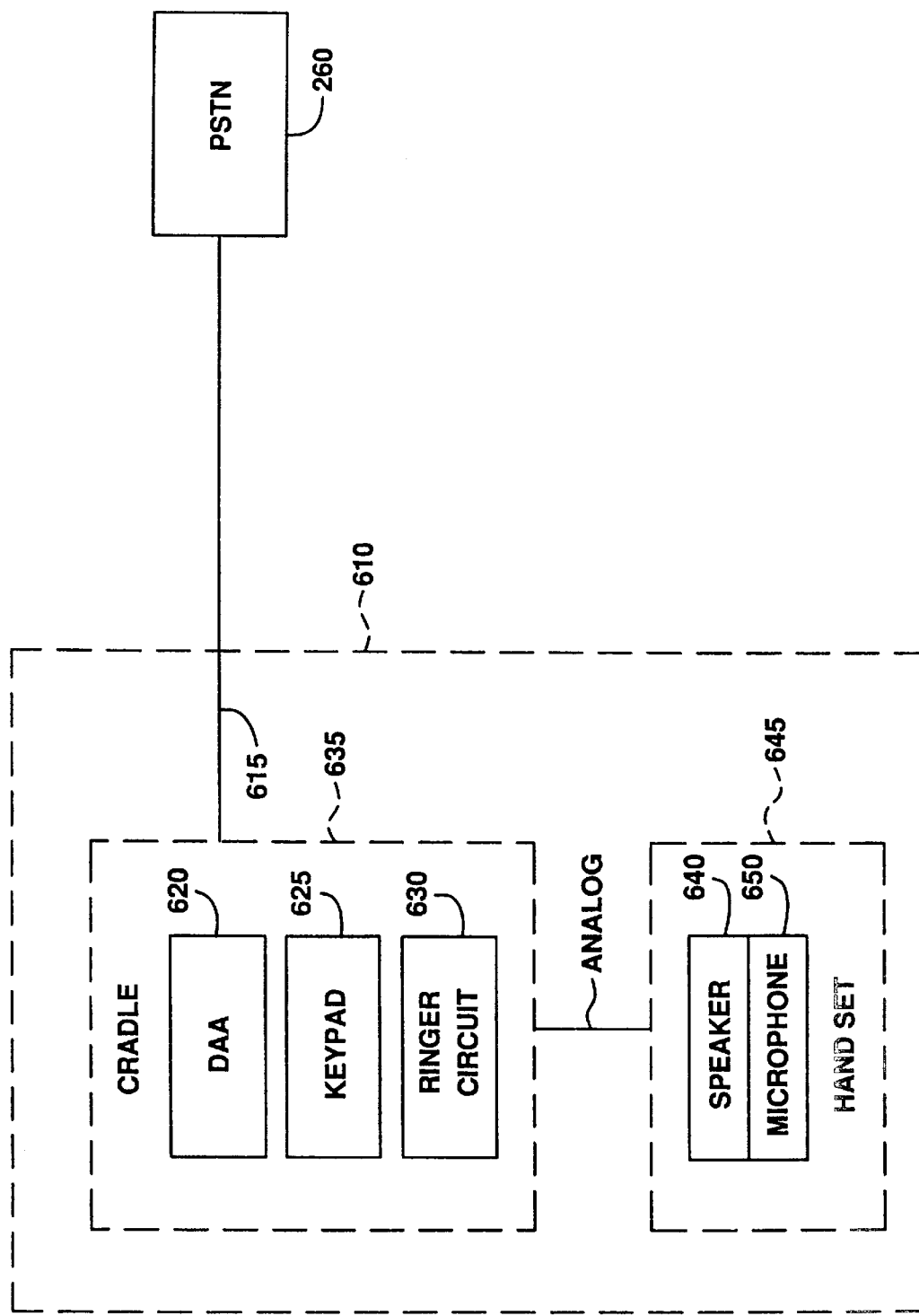
FIG. 6 is a block diagram of a conventional land-line telephone unit.

Referring now to FIG. 6, a block diagram of a conventional landline telephone is shown generally at 610. This telephone 610 consists of a cradle 635 and a handset 645. The telephone 610 is connected to the PSTN 260 by a wire-line connection 615 which carry analog or digital telephone signals. It can be readily appreciated that the wire-line connection 615 can be substantially identical to the associative path 261 shown in FIG. 3 and described hereinabove. The cradle 635 includes Data Access Arrangement (DAA) section 620, key pad 625, and ringer circuit 630. On the other hand, the handset 645 includes speaker 640 and microphone 650. The DAA 620 contains analog filters and other known protection devices required to connect to the PSTN 260. The key pad 625 is used to provide the number to be called to the PSTN 260. Ringer circuit 630 and known associated signaling means are provided to inform the user when there is an incoming call.

Figure 7:
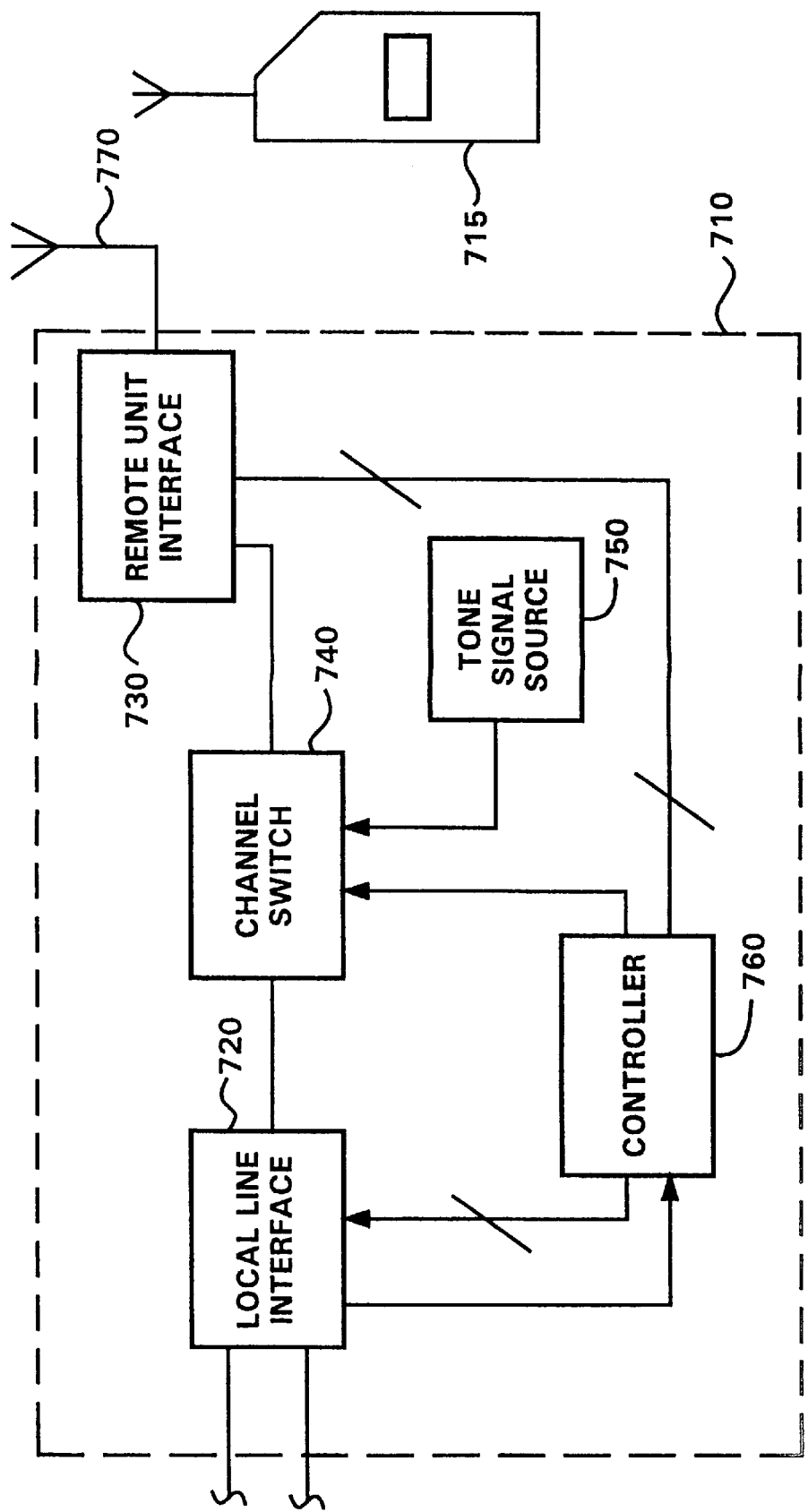
FIG. 7 is a block diagram of a conventional cordless phone base unit.

FIG. 7 illustrates a block diagram of a conventional cordless phone base unit, generally shown at 710, which can be operable, for instance, at frequencies close to or within the 46 MHZ to 49 MHZ frequency range. The cordless phone base unit 710, conceptually, is a subminiature cellular system providing at least a signaling channel which transmits outbound signals in a fashion similar to a conventional cellular outbound signaling channel, and receives service requests from a remote hand-held unit 715.

The base unit 710 has a local PSTN line interface 720, a remote unit interface 730 coupled to an antenna 770, a channel switch 740, a tone signal source 750 generating tone signals such as a ringing tone signal, and a controller 760. The channel switch 740 selectively makes a channel between the local PSTN line interface 720 and the remote unit interface 730, and a channel between the tone signal source 750 and the remote unit interface 730. It is known in the art that the local PSTN line interface 720 may comprise a hook circuit (not shown) performing an open/close control of a loop, a call detection circuit (not shown) for detecting a call signal and a sender (not shown) for sending dialing push-button signals. It is also well known in the art that the remote unit interface 730 comprises a voice-band processing circuit (not shown), a mixer (not shown), a radio transceiver (not shown) coupled to the antenna 770. The controller 760 controls the local PSTN line interface 720, the channel switch 740, and the remote unit interface 730.

Figure 8:
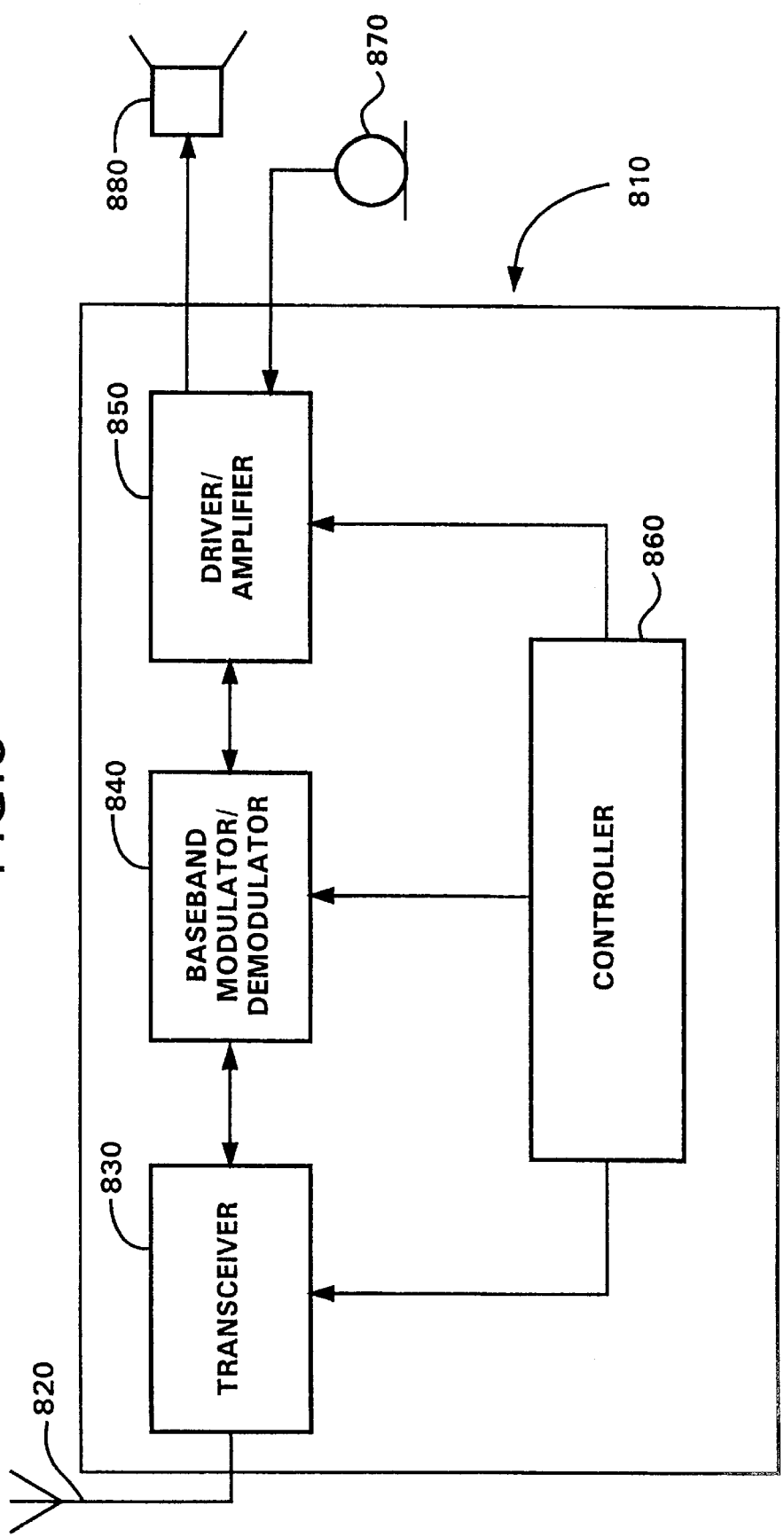
FIG. 8 illustrates a block diagram of a conventional wireless headset unit.

Referring now to FIG. 8, reference numeral 810 generally shows a block diagram of a wireless headset according to an aspect of the present invention. An antenna 820, operable to receive and transmit local communication signals which may be effectuated using either standard wireless communication protocols or a proprietary protocol, is electrically connected to a radio transceiver 830. As is well known in the art, the functionality of the radio transceiver 830 may be implemented in numerous known ways, with attendant electronic circuitry for tuning etc.

Continuing with FIG. 8, the signal output from the radio transceiver 830 is then fed into a baseband modulator/demodulator block 840 which either extracts the information signal from the local carrier radio wave or modulates the local carrier radio wave using the information signal. The in-coming information signal is then fed into a speaker 880 via a driver/amplifier block 850. It is well known in the art that the speaker 880 and the driver/amplifier block 850, in physical implementation, may take a variety of known forms. The out-going information signal is generated by a microphone 870 which is amplified by the driver/amplifier block 850. The amplified out-going information signal is then modulated with a local carrier radio wave for local transmission over a local medium. A controller block 860 is preferably provided which is in circuit communication with the radio transceiver 830, the baseband modulator/demodulator 840 and the driver/amplifier 850, in order to supervise the bi-directional transfer of the information signals. In one aspect of the present invention, the controller block 860 may comprise a microprocessor, a plurality of control switches, memory and/or hard-wired digital logic. In yet another aspect of the present invention, the implementation of the wireless headset may include a single housing with its own push button key pad and related control buttons, and a portable power source such as a rechargeable battery. In an additional aspect, the wireless headset may include two earphones, a swing-out microphone, flexibly mounted to the housing, a volume control for enhanced realistic binaural sound, and a supplementary head strap for securing the unit to the user's head. Further, the antenna 820 may preferably be disposed within the swing-out arm provided for the microphone 870, although in still another aspect of the invention, it may be coupled to one of the earphones such that it is extendable from the housing of the earphone. Moreover, in lieu of a conventional on/off switch, there may preferably be provided a voice-activated mechanism to facilitate connection/disconnection of a local communication link with the headset. Additionally, the earphones may preferably be formed of a resilient rubber or plastic material to securely engage the user's ear and minimize the reception of external background noise. Alternatively, the earphones may be cupped cushions for foam cushions similar to high fidelity earphones in order to further reduce ambient background noise. Furthermore, it should be understood upon reference hereto that the aesthetic aspects of the wireless headset may in turn give rise to certain design features as well.

Figure 9A:
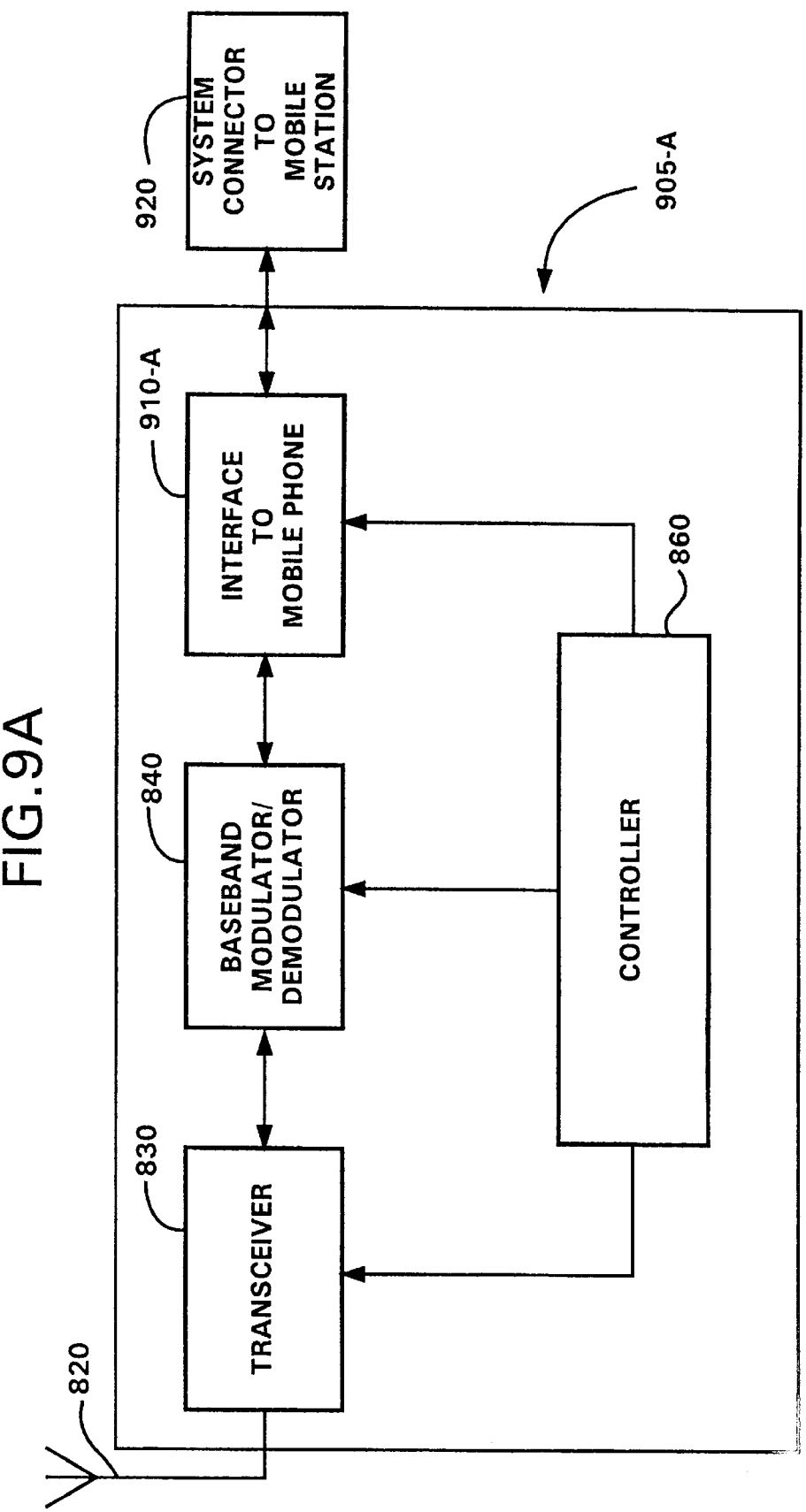
FIG. 9A depicts a block diagram of a presently preferred embodiment of a local interface module adapted for use with a mobile station in accordance with the present invention.
Figure 9B:
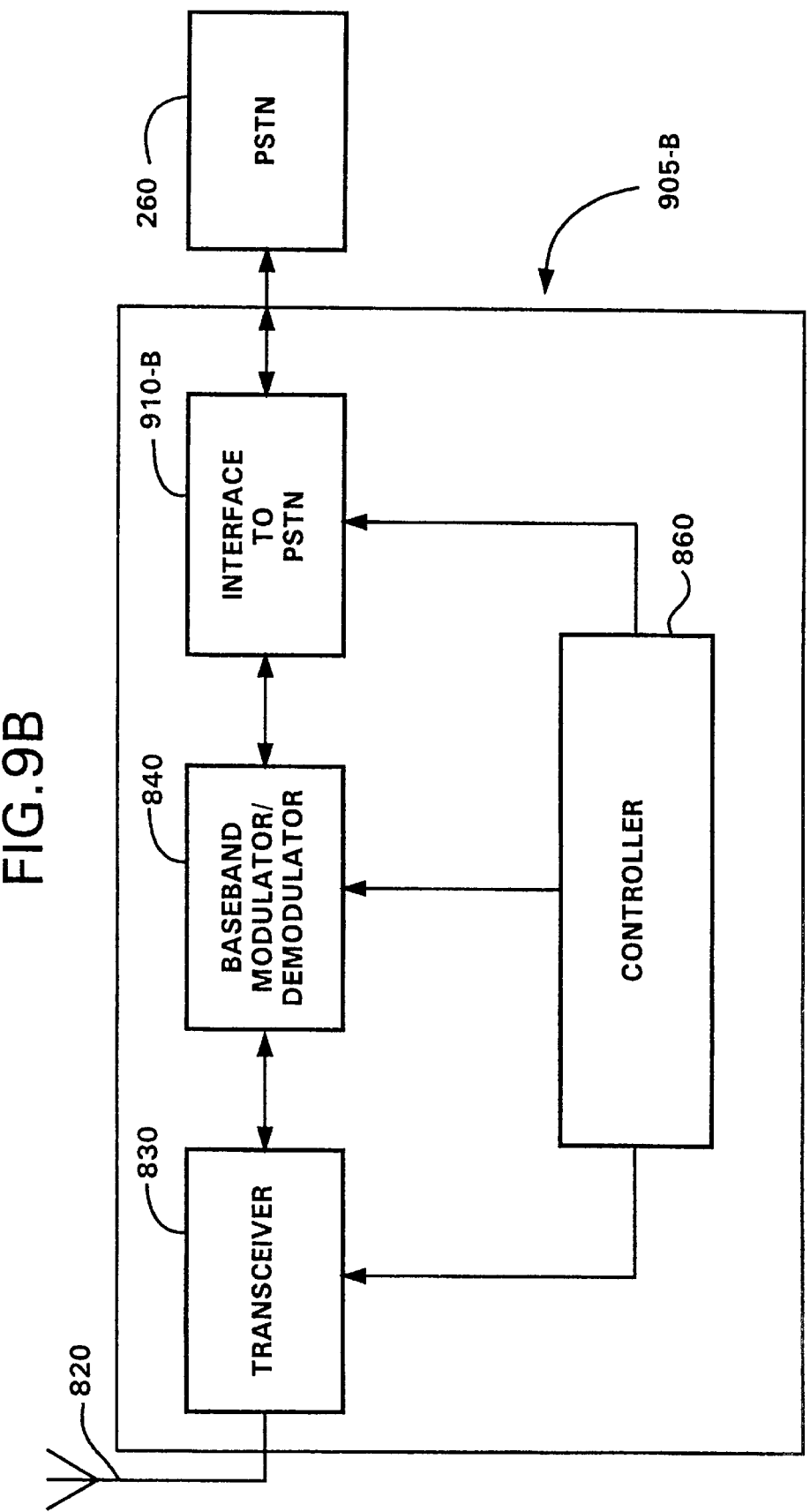
FIG. 9B is a block diagram of a presently preferred embodiment of a home base station or directly-connectable local interface module adapted for use with a PSTN in accordance with the present invention.
Figure 9C:
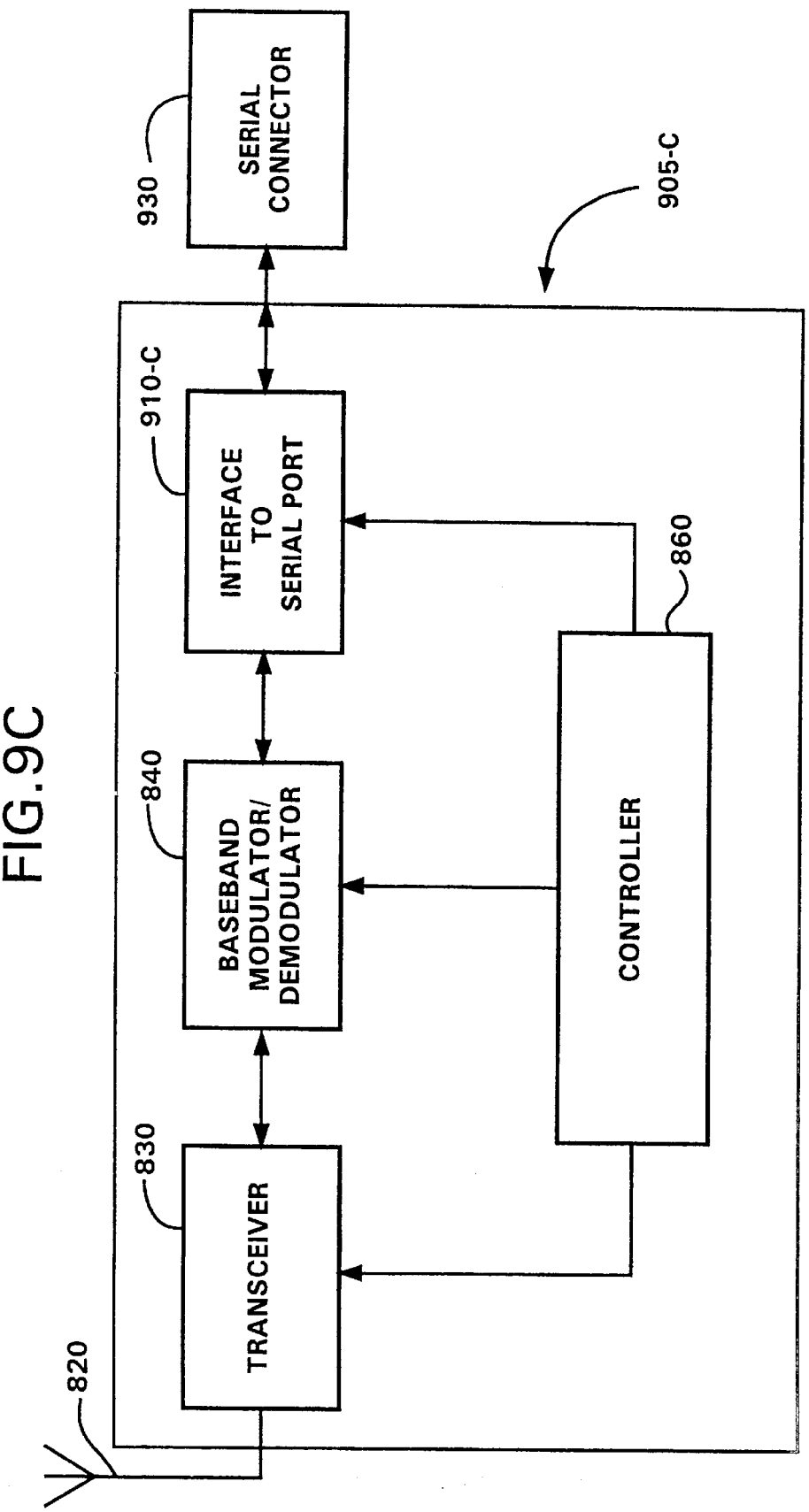
FIG. 9C is a block diagram of a presently preferred embodiment of a local interface module adapted for use with a serial computer port connector in accordance with the present invention.
Figure 9D:
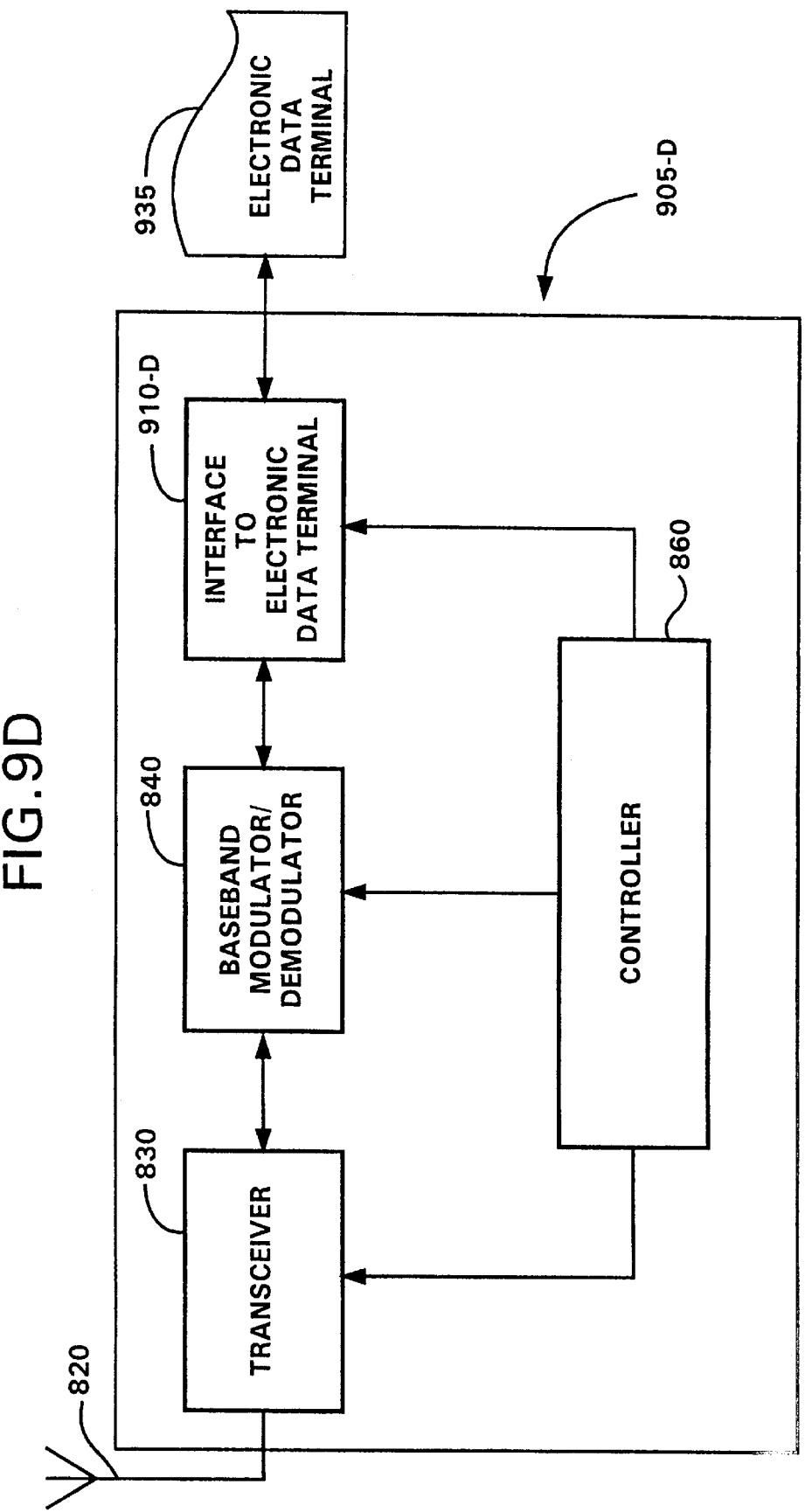
FIG. 9D is a block diagram of a presently preferred embodiment of a local interface module adapted for use with an electronic data terminal in accordance with the present invention.

FIG. 9A is a block diagram of a presently preferred exemplary embodiment of a local interface module adapted for use with the mobile station 240 (not shown) that is associated with the PLMN 270 (not shown). FIG. 9B is a block diagram of a presently preferred exemplary embodiment of a local interface module adapted as a directly-connectable home base station associated with the PSTN 260. FIG. 9C is a block diagram of a presently preferred exemplary embodiment of a local interface module adapted for use with a serial computer port connector. FIG. 9D is a block diagram of a presently preferred exemplary embodiment of a local interface module adapted for use with the electronic data terminal 230. FIG. 9E is a block diagram of a presently preferred exemplary embodiment of a local interface module adapted for use with the cordless phone base unit 210 associated with the PSTN 260.

Referring now specifically to the local interface modules, 905-A to 905-E of FIGS. 9A to 9E, respectively, it can be readily appreciated that according to a presently preferred exemplary embodiment of the present invention, the local interface modules are substantially identical to one another, and to a great extent, are similar to the wireless headset, shown in FIG. 8. As described hereinabove, the antenna 820 is operable to receive and transmit local communication signals which may be effectuated using either standard wireless communication protocols or a proprietary protocol, on a single local communication medium which can be an electromagnetic wave, an infra-red wave, a radio wave, a microwave, a magnetic wave, an optic wave or even a wireline connection. The modulation and demodulation of the communication signal is achieved by the baseband modulator/demodulator 830 which is coupled to an interface circuitry block, 910-A through 910-E. The interface circuitry block 910-A effectuates appropriate conversion of communication signals between the local interface module 905A and a system connector 920 coupled to the mobile station 240 (not shown). The interface circuitry block 910-B effectuates appropriate conversion of communication signals between the directly-connectable local interface module 905-B (or, home base station, as has been described hereinabove) and the PSTN 260. The interface circuitry block 910-C effectuates appropriate conversion of communication signals between the local interface module 905-C and a serial port connector 930. In one aspect of the present invention, the serial port connector 930 may preferably be an RS-232 type connector. Alternatively, the interface circuitry block 910-C may be of PCMCIA-Standard-compatible, as described in a co-assigned pending U.S. patent application Ser. No. 08/353,966, cross-referenced hereinabove and incorporated by reference herein. The interface circuitry block 910-D effectuates appropriate conversion of communication signals between the local interface module 905-D and the electronic data terminal 935. The interface circuitry block 910-E effectuates appropriate conversion of communication signals between the local interface module 905-E and the cordless phone base unit 210 that is associated with the PSTN 260.

According to a presently preferred embodiment of the present invention, each of the local interface modules 905-A to 905-E may preferably be disposed within the housing of the communication device (not shown) with which it is to interface. Alternatively, the local interface module may also be disposed in a separate housing such that it forms a pluggable unit to be received in a module port in the communication device. As mentioned hereinabove, the controller module 860 in FIGS. 9A to 9E is substantially similar to the controller module 860 in FIG. 8.

Figure 11A:
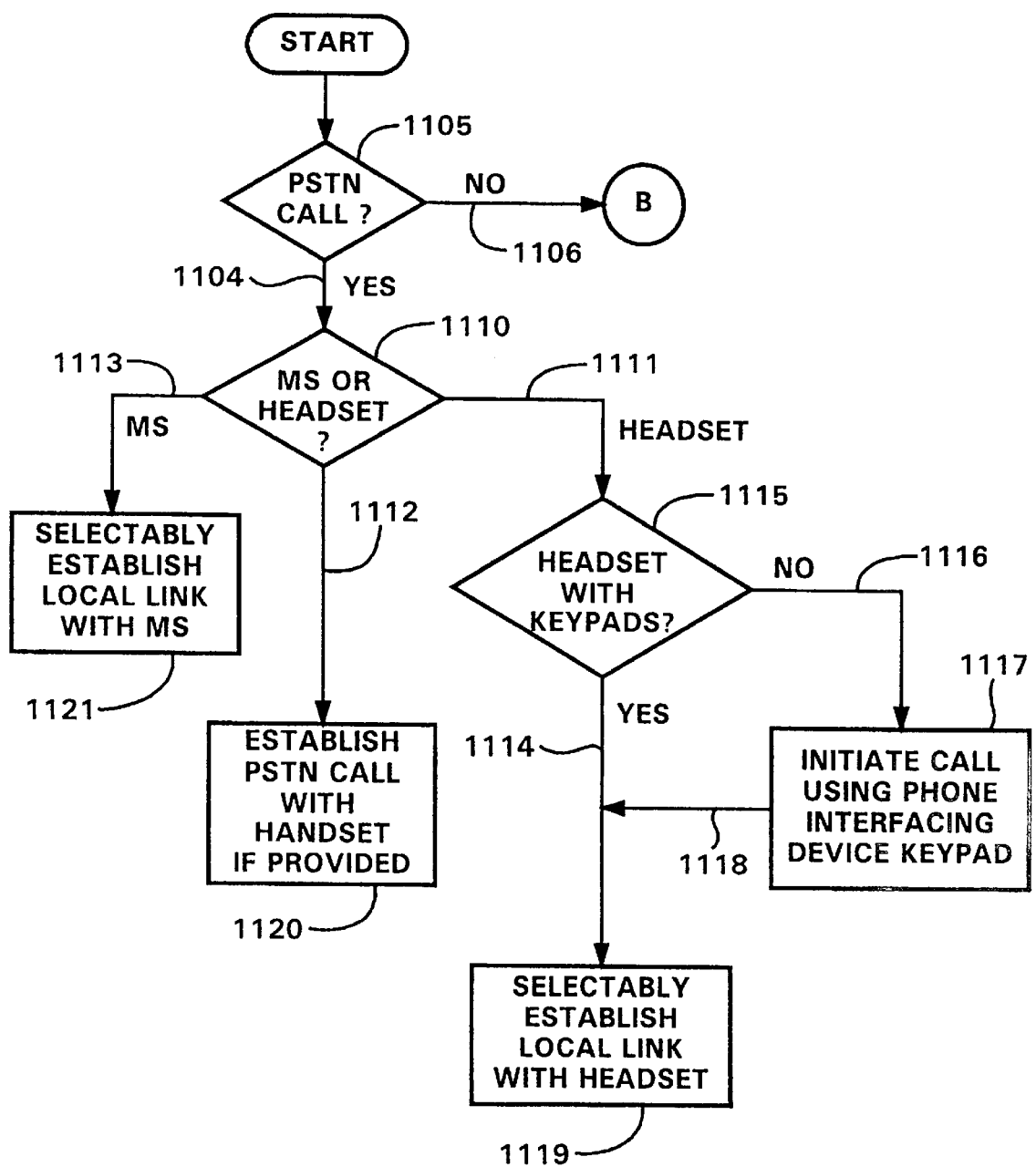
FIG. 11A and FIG. 11B show an exemplary decision tree that may be used in accordance with the present invention to selectably effectuate local wireless communication for call initiation.
Figure 11B:
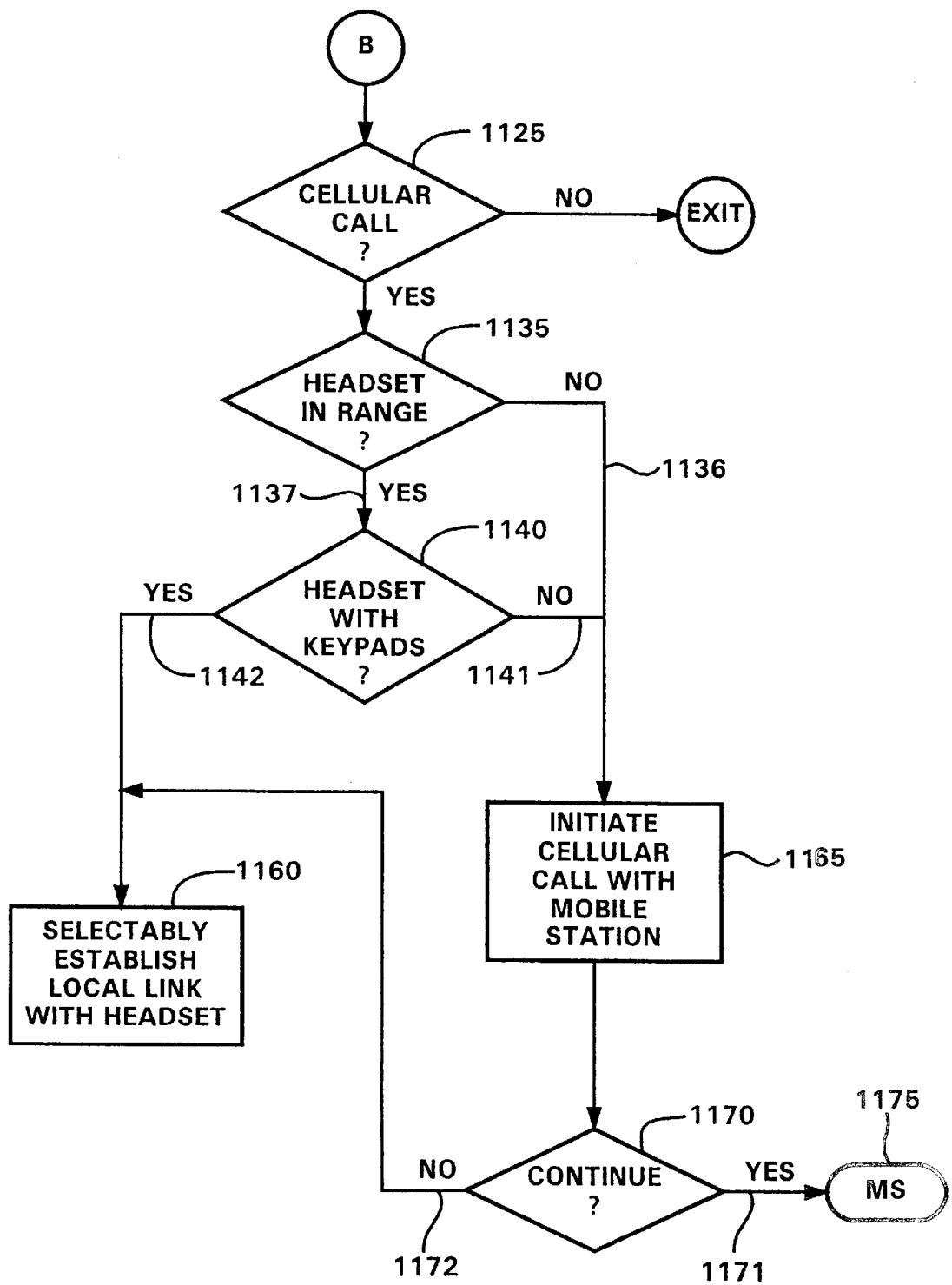

FIGS. 10, 11A and 11B show two flowcharts illustrating an exemplary decision tree that may be used according to the teachings of the present invention in order to effectuate local wireless communication among at least a radio-enhanced phone interface device, a mobile station and a wireless headset. Since maximization of user convenience and flexibility is a desired object of the present invention, different decision trees may be employed to suit different conditions of operation.

Referring now specifically to FIG. 10, therein is shown a flowchart for selectably effectuating local wireless communication links for call reception. Steps 1005 and 1020 are decision blocks to determine if the incoming call is a PSTN call or if it is a cellular call over the PLMN. If the call is a PSTN call, then the user needs to determine if the mobile station or the headset is to be used to function as the call terminating device. This step is provided in the decision block 1010. If the mobile station is present within the geographic area of coverage provided for the radio transceiver unit of the local interface module attached to the radio-enhanced phone interface device and the user selects to use the mobile station to receive the PSTN call, the user takes the MS path 1011. Upon making that determination, the user can selectably establish a wireless local communication link between the mobile station and the radio-enhanced phone interface device as shown at 1015. On the other hand, if the mobile station is out of range for use with the radio-enhanced phone interface device, or if the user desires to use the wireless headset to receive the incoming PSTN call, the user takes the Headset path 1013 to selectably establish in step 1017 a local wireless communication link between the wireless headset and the radio-enhanced phone interface device. Further, if the wireless headset is out of range, or if the user does not desire to use the wireless headset, then the user may proceed as in step 1016 to receive the PSTN call by using the conventional wireless, or corded, handset by taking the path shown at 1012.

If the incoming call is a cellular call, as determined by step 1020, then the user has a choice of using the mobile station in a conventional manner to receive that call, shown in step 1035, or establish a wireless local communication link between the mobile station and the wireless headset, provided they are within a suitable range from each other, as shown in step 1040.

Referring now to FIGS. 11A and 11B, therein is shown an exemplary decision tree for initiating a call according to the teachings of an aspect of the present invention. Decision blocks 1105 and 1125 are employed to determine whether the outgoing call is to be transmitted over the PLMN or the PSTN. If the outgoing call is a PSTN call, the user takes the YES path shown at 1104. After this step, the user has the choice of call initiation by using a wireless headset with keypads, or by using a mobile station as shown in the decision block 1110. If the user desires to use the mobile station and if the mobile station is within the local range of the radio-enhanced phone interface device, the user may by taking the MS path 1113 selectably establish the local communication link between the mobile station and the radio-enhanced phone interface device as shown in 1121. If the user desires, on the other hand, to use the headset by taking the Headset path 1111, subsequent steps of the decision tree are dependent on whether the wireless headset is equipped with its own key pad necessary for remote operation. This condition is tested in the decision block 1115. If the determination is No, the user takes the path 1116 to initiate the PSTN call using the key pads associated with the radio-enhanced phone interfacing device as shown in step 1117. Afterwards, the user can return via path 1118 to using the wireless headset as in step 1119 which is also reached if the user takes the YES path 1114 from the decision block 1115. Alternatively, if neither the mobile station nor the wireless headset is selected by the user, then call initiation over the PSTN will proceed by using a conventional handset, if provided with the radio-enhanced phone interface device, shown in step 1120.

Similarly, if the outgoing call is a cellular call as determined in 1125, the user then has the choice of using either the headset, or the mobile station. If either the headset is not in a suitable range, or if the headset is not equipped with a key pad, then the user initiates the cellular call using the mobile station as shown in step 1165 which is reached via either 1141 or 1136. After initiating the cellular call using the mobile station, the user has the option of returning to using the headset via a return path 1172, or continue using the mobile station as shown in 1175. Also, by taking the YES step 1142 from the decision block 1140, the user may selectably establish a local communication link between the headset and the mobile station as shown in 1160. Although presently preferred exemplary embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, it will be readily appreciated that the local communication paths may also comprise infrared (IR) or microwave or magnetic wave links and the corresponding receivers/transmitters will be used in lieu of radio transceivers. Additionally, the term "radio transceiver" as used herein comprises appropriate radio control logic of the type necessary to constitute a radio device that is capable of communicating using a wireless communication standard such as DAMPS, GSM, DECT etc. The transceiver may include, in addition to a transmitter and receiver, data modem circuitry, when the communications device is used for data transmission. Further, both local and non-local (that is, disposed between the plurality of communications devices and their respective external communications networks) communications signals may be analog or digital, and may comprise voice, video and data. Accordingly, it will be readily appreciated by the persons of ordinary skill in the art upon reference hereto that the exemplary modifications and substitutions mentioned hereinabove do not depart from the spirit of the present invention, directed to a local area communication system (LACS) capable of effectuating a local communication path among a plurality of communications devices using a single local communication medium.

What is claimed is:

1. A circuit assembly for effectuating a communication link between a first locally-positioned communication device and an external communication system of which a locally-positioned headset forms a portion, the first locally-positioned communication device and the locally-positioned headset together positioned within a local area, said circuit assembly comprising:

a first local interface module operably coupled to the first locally-positioned communication device, said first local interface module at least for transmitting, within at least the local area, a local transport-send signal generated by the first locally-positioned communication device;

a second local interface module operably coupled to the locally-positioned headset, said second local interface module at least for receiving the local transport-send signal transmitted by said first local interface module and for providing the local transport-send signal to the locally-positioned headset, thereby to effectuate the communication link with the external communication system of which the locally-positioned headset forms the portion.

2. The circuit assembly of claim 1 being adapted for a user wherein said headset comprises a wireless headset, said wireless headset being adapted to be positioned about the user's head.

3. The circuit assembly of claim 2 wherein said wireless headset further comprises:

a housing for attachment to the user's head;

a transceiver disposed in said housing for receiving and transmitting local communication signals;

an antenna coupled to said transceiver;

a controller for controlling said transceiver, said controller operably connected to said transceiver;

at least one earphone having a speaker, said at least one earphone attached to said housing;

a microphone attached to said housing;

a power source contained within said housing; and an amplifier contained within said housing, said amplifier operably connected to said transceiver for amplifying local communication signals received by said transceiver.

4. The circuit assembly of claim 1 wherein said two-way communication link is effectuated upon a magnetic medium.

5. The circuit assembly of claim 1 wherein said two-way communication link is effectuated upon at least-one of a microwave medium and an optic wave medium.

6. A method for establishing communication over a wireless local communication system having a mobile station associated with a mobile cellular telecommunication network, a radio-enhanced base station associated with a landline public switching telephone network, a wireless headset capable of communicating with at least one of said mobile station and said radio-enhanced base station, each of said mobile station, said radio-enhanced base station and said wireless headset being coupled to a separate local interface module, said method comprising the steps of:

determining if said mobile station is within a first transmission range associated with said radio-enhanced base station;

selectably establishing a first local wireless path between said mobile station and said radio-enhanced base station if said mobile station is within a first transmission range associated with said radio-enhanced base station;

otherwise determining if said mobile station is within a second transmission range associated with said wireless headset;

selectably establishing a second local wireless path between said wireless headset and said mobile station if said mobile station is within a second transmission range associated with said wireless headset;

otherwise determining if said wireless headset is within said first transmission range associated with said radio-enhanced base station;

selectably establishing a third local wireless path between said wireless headset and said radio-enhanced base station if said wireless headset is within said first transmission range associated with said radio-enhanced base station, wherein each of said first local wireless path, said second local wireless path and said third local wireless path is effectuated on a common local communication protocol.

* * * * *